United States Patent [19]

Wertz

[11] 3,811,762
[45] May 21, 1974

[54] FILM DISPLAY APPARATUS

[76] Inventor: C. Kenneth Wertz, 601 W. 91st St., Indianapolis, Ind. 46260

[22] Filed: Sept. 17, 1971

[21] Appl. No.: 181,377

[52] U.S. Cl. .................................. 353/26, 353/78
[51] Int. Cl. ..................... G03b 21/11, G03b 21/28
[58] Field of Search ............................ 353/25–27, 353/77, 78; 242/203

[56] References Cited
UNITED STATES PATENTS

| | | | |
|---|---|---|---|
| 3,597,070 | 8/1971 | Slettebo | 353/26 |
| 3,141,626 | 7/1966 | Hoskin | 242/203 |
| 2,464,220 | 3/1949 | Duncan | 353/26 |
| 2,485,709 | 10/1949 | Dacock | 353/78 |
| 3,535,029 | 10/1970 | Portman | 353/26 |

FOREIGN PATENTS OR APPLICATIONS

| 776,021 | 1/1968 | Canada | 242/203 |

Primary Examiner—Louis R. Prince
Assistant Examiner—A. Jason Mirabito
Attorney, Agent, or Firm—Woodard, Weikart, Emhardt & Naughton

[57] ABSTRACT

An apparatus for displaying a reelable strip of film. The apparatus has a frame connected to a housing with a plurality of image-directing mirrors mounted to the frame and within the housing. A source of light mounted to the housing directs light through the strip of film to the mirrors in order to display a film image on a display screen mounted to the frame. Each carriage has a spring loaded spool which receives one end of the film. The spring loaded spools are arranged to apply opposite directed forces to the opposite ends of the film thereby placing the film in a state of tension. A sprocket is rotatably mounted to the frame and drivingly engages the film. Rotation of the sprocket by a knob forces the film past the light. As the film is extended from one carriage, the other carriage retracts the film.

6 Claims, 6 Drawing Figures

INVENTOR.
C. KENNETH WERTZ

PATENTED MAY 21 1974 3,811,762

INVENTOR.
C. KENNETH WERTZ
BY
Woodard, Weikart, Emhardt & Naughton
ATTORNEYS

FILM DISPLAY APPARATUS

BACKGROUND OF THE INVENTION

1. Field of the Invention

This invention is in the field of devices for displaying film.

2. Description of the Prior Art

In many cases, it is desirable to view a film with a compact device without projecting the film image on a screen located a great distance from the viewer. Thus, devices have been provided which may be placed atop a table so as to allow convenient viewing of the film. One such apparatus is disclosed in the U. S. Pat. 2,464,220 issued to Duncan. Typically, one end of the film is attached to a rotatable reel while the remainder of the film is mounted on a second reel. A belt-pulley arrangement is typically used, as shown in the Duncan patent, to simultaneously drive both reels so as to force the film past a source of light and magnification apparatus. I have devised a new and improved manner of spring loading the opposite ends of the film so as to eliminate the necessity for pulleys, belts, gears, and other similar elements. As a result, my improved display apparatus is considerably less complex and inexpensive to manufacture. Parts, such as belts and gears, do not have to be replaced thereby allowing for a considerable reduction in the maintenance. Other devices have been devised for displaying individual short strips of film. Three such devices are shown in the following U.S. Pat. Nos.: 2,943,410 issued to Haggar; 3,161,105 issued to Offensend; and, 3,476,472 issued to Schneeberger.

SUMMARY OF THE INVENTION

One embodiment of the present invention is in combination with an apparatus for viewing a reelable strip of film, the apparatus having a frame, a source of light mounted on the frame, guide means mounted on the frame and operable to guide the film in a path past the source, a viewing screen mounted on the frame in position to receive the film image after the light passes through the film; driving means mounted to the frame and engageable with the film being operable to force the film lengthwise in said path past the light source; and, a first and second film carriage mounted on the frame to receive opposite ends of the film, the first and second carriages each having spring means to exert opposite tension forces on the film.

It is an object of the present invention to provide a new and improved film display apparatus.

It is a further object of the present invention to provide a film display apparatus which does not use pulleys and belts.

Related objects and advantages of the present invention will be apparent from the following description.

DESCRIPTION OF THE PREFERRED EMBODIMENT

Figure 1:
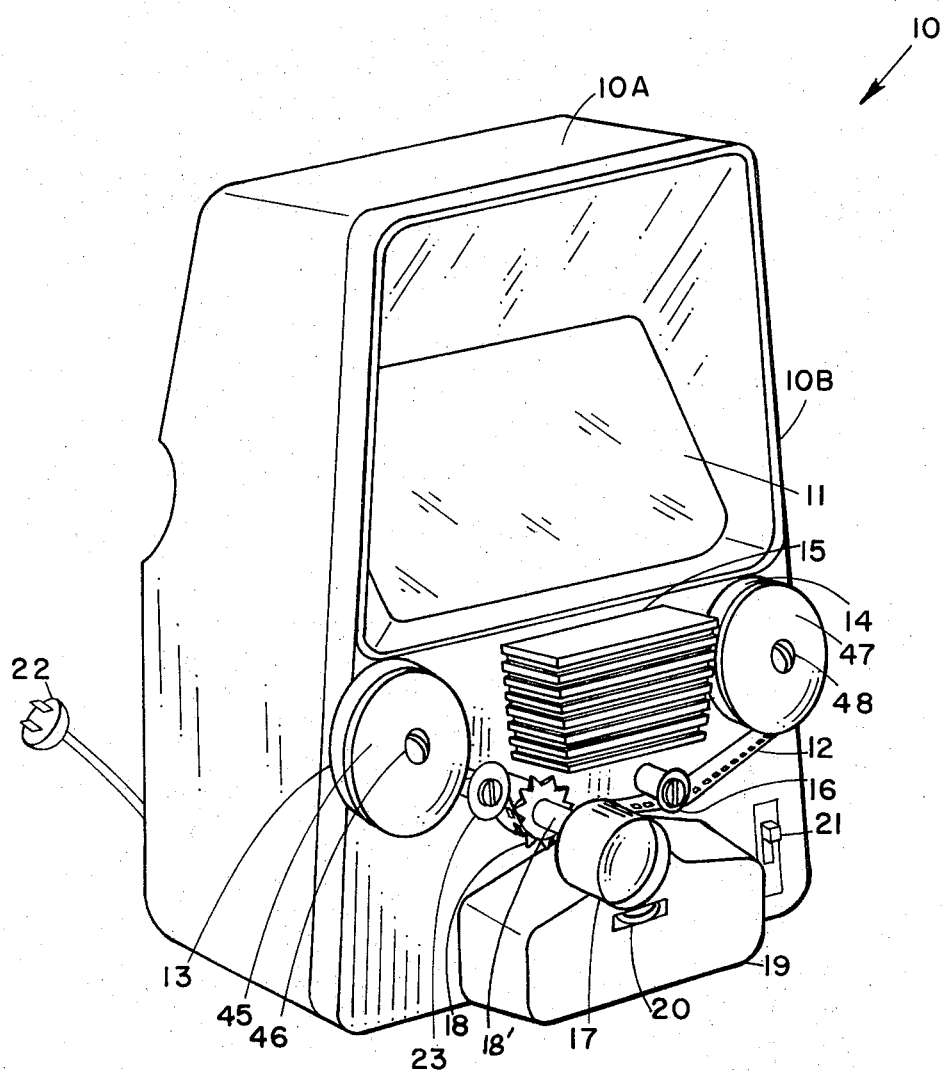
FIG. 1 is a perspective view of a film display apparatus incorporating the present invention.

For the purposes of promoting an understanding of the principles of the invention, reference will now be made to the embodiments illustrated in the drawings, and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a film display apparatus 10 having a front frame 10B mounted to a rear housing 10A. Standard fastening means, such as screws, are used to secure housing 10A to frame 10B. The housing may be produced from a light-weight plastic material whereas the frame may be produced from a metal. A viewing screen 11 is fixedly mounted to frame 10B for receiving a light image of reelable film 12 having opposite ends connected to carriages 13 and 14. A light within light housing 15 mounted to frame 10B projects a beam of light downwardly passing through film 12. The light continues downward through the film and is received by a standard magnifier mounted within magnifier housing 19 secured to frame 10B. The image passing through the magnifier is then directed through a plurality of mirrors eventually being displayed on screen 11. A focusing wheel 20 is provided to adjust the focus of the image projected onto the mirrors and display screen.

Figure 2:
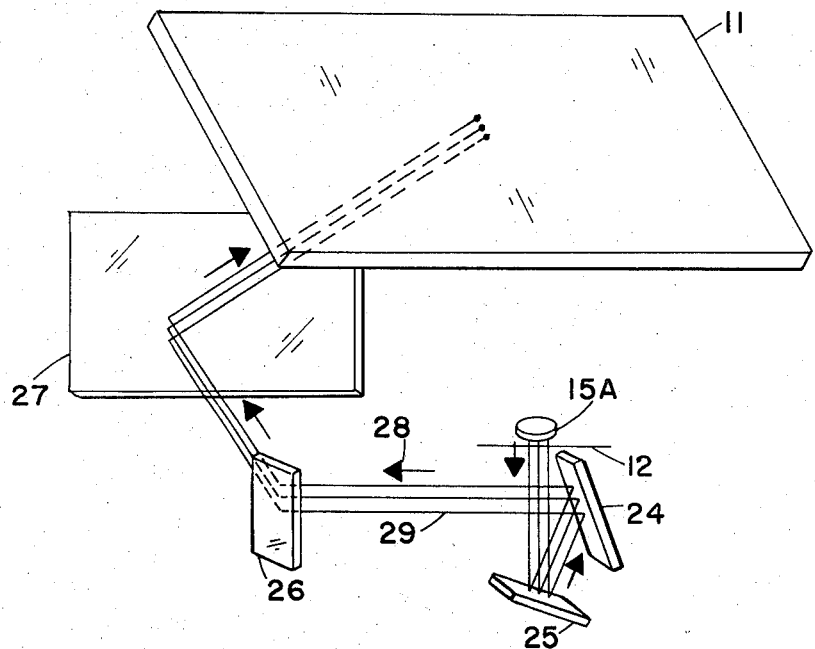
FIG. 2 is a schematic representation of an arrangement of mirrors within the apparatus of FIG. 1 to direct a film image onto a screen.

A variety of different means may be utilized to project the image of the film onto the display screen. One method of directing the film image is shown schematically in FIG. 2. Light 15A which is mounted within light housing 15 (FIG. 1), projects a beam of light downwardly through film 12 reflecting off of mirror 25 and into mirror 24, both mirrors being mounted within magnifier housing 19. The image 29 then reflects off of mirror 24 in the direction of arrow 28 to mirror 26 mounted to frame 10B. The light image then reflects off of mirror 26 to mirror 27 which is mounted to the rear wall of housing 10A. The image reflects off of mirror 27 and is then displayed on display screen 11. Of course, mirrors 24 through 27 must be positioned at the correct distances and must point in the right direction in order to display the film image on display screen 11. The field of art in positioning these mirrors is quite well developed and as a result will not be discussed herein. Likewise, the art of magnifying, focusing and projecting a light are also quite well known. For example, the electrical energy required to operate light 15A may be received by a conventional electrical connector 22 (FIG. 1) connected to light 15A. A standard stepdown transformer may be provided in the apparatus to convert the electrical energy to a level suitable for operating light 15A. In addition, an off-on switch 21 may be provided to control the flow of electrical energy to the light.

Figure 4:
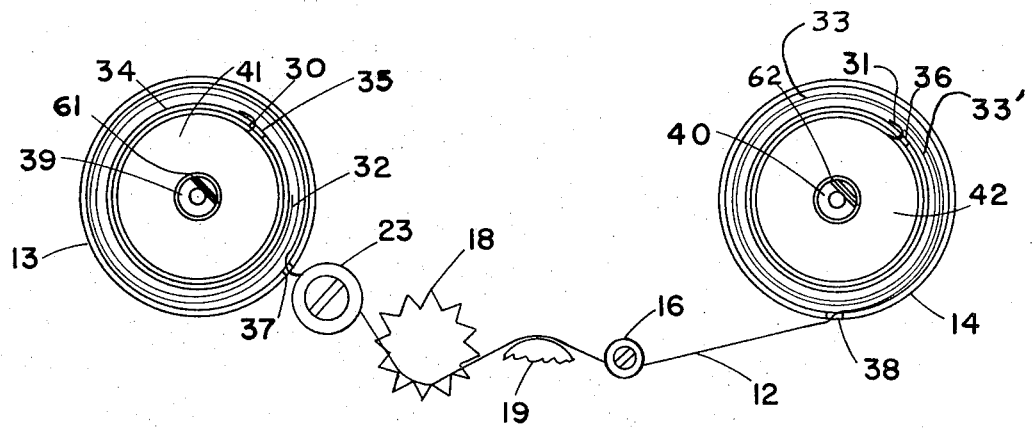
FIG. 4 is the same view as FIG. 3 only showing discs 41 and 42 in place.

Carriages 13 and 14 are mounted to the front of frame 10B and have disc-shaped outer covers 45 and 47 secured thereto by screws 46 and 48. FIG. 4 is a schematic front view of carriages 13 and 14 with covers 45 and 47 removed. Carriage 13 has an inner spool 34 which receives end 32 of film 12. Likewise, carriage 14 has an inner spool 33 which receives the opposite end 33' of film 12. The ends 32 and 33' are shown spaced away from spools 34 and 33 for purposes of clarity; however, it is understood that the film is tightly wrapped onto each spool.

Figure 5:
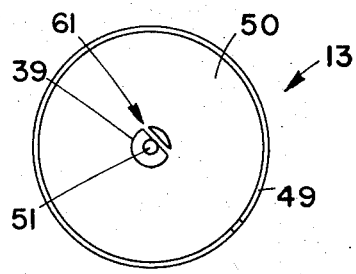
FIG. 5 is a front view of carriage 13 with the film, spool and spring removed.
Figure 6:
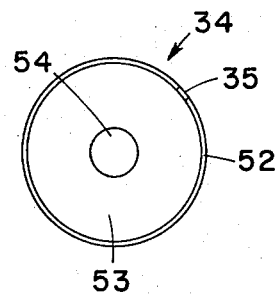
FIG. 6 is a front view of spool 34 shown in FIG. 3 with the spring removed therefrom.

Carriage 13 will now be described, it being understood that a similar description applies to carriage 14. A front view of carriage 13 is shown in FIG. 5 with the inner spool and film being removed therefrom. The carriage has a back vertical wall 50 integrally joined to the rear edge of a ring-shaped wall 49 thereby forming a cavity for receiving spool 34 which is shown in FIG. 6. A rod 39 is integrally joined to wall 50 and projects horizontally outward having a threaded center 51 for receiving screw 46. Cover 45 (FIG. 1) has an outside diameter equal to the diameter of wall 49 and encloses the cavity formed by walls 49 and 50 when mounted to rod 39 by screw 46. A slot 37 (FIG. 4) is provided in wall 49 for freely receiving film 12 which wrappingly extends counterclockwise around spool 34. Likewise, a similar slot 38 is provided in the ring-shaped wall of carriage 14 for receiving film 12 which wrappingly extends counterclockwise around spool 33.

Figure 3:
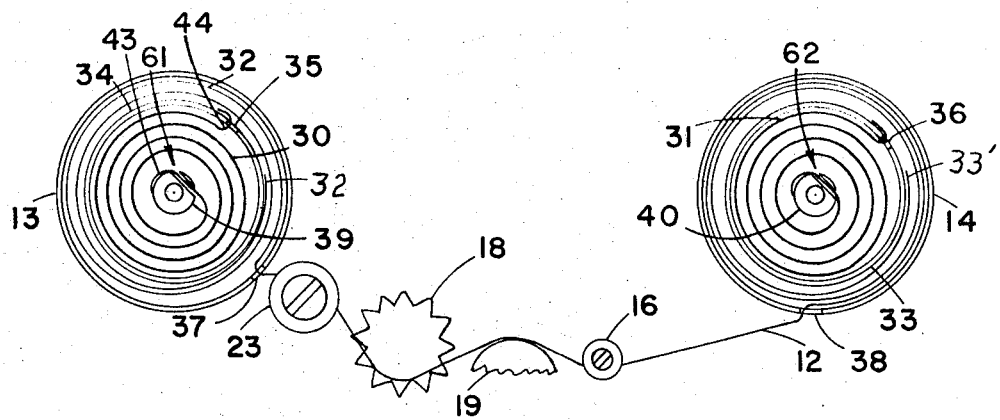
FIG. 3 is a schematic representation of carriages 13 and 14 of FIG. 1 with the outer covers 45 and 47 removed and showing the film extending therebetween.

Spool 34 is identical to spool 33. Each spool has a vertical rear wall 53 (FIG. 6) integrally joined to the rear edge of a ring-shaped wall 52. A hole 54 is provided in the center of wall 53 allowing rod 39 to project freely therethrough. The diameter of hole 54 is slightly larger than the diameter of rod 39 therefore allowing the spool to rotate on the rod. Spool 34 is shown mounted to rod 39 in FIG. 3 whereas spool 33 is mounted to rod 40. A helical wound spring strip 30 has an inner end 43 which extends through slot 61 of rod 39. Strip 30 then extends away from rod 39 in a clockwise direction having an outer end 44 connected through in hooked fashion to slot 35 provided in wall 52 of spool 34. Thus, spring strip 30 will urge spool 34 in a counterclockwise position, therefore applying tension to film 12. A helical wound spring strip 31 identical to spring strip 30 has an inner end slipped through slot 62 of rod 40 with its outer end connected in hooked fashion through slot 36 of the ring-shaped wall of spool 33. Strip 31 extends in a clockwise direction away from rod 40 therefore urging spool 33 in a counterclockwise direction and therefore applying tension to film 12. Each strip 30 and 31 is yieldable to allow the spools to rotate in the opposite clockwise direction. A pair of discs 41 and 42 are slipped onto the outer ends of rods 39 and 40 with each disc having an outside diameter smaller than the inside diameter of the ring-shaped walls of spools 34 and 33. Discs 41 and 42 prevent strips 30 and 31 from disengaging the spools when covers 45 and 47 are mounted to the carriages. Each disc is positioned within the ring-shaped wall of the associated spool.

Helical springs 30 and 31 exert opposite tension forces on the film. As a result, when the film is pulled from carriage 13, the film will authomatically retract into carriage 14. Likewise, when the film is pulled from carriage 14 the film will automatically retract into carriage 13. Also, since the film is under tension, slack will not exist in the film so as to interfere with the driving sprocket 18. As shown in FIG. 1, a plurality of standard apertures extend along one edge of film 12 and are engageable by the teeth of the driving means which is sprocket 18. Sprocket 18 is fixedly mounted to rod 18' which is rotatably mounted to frame 10B. The outer end 17 of rod 18' is formed as a knob so as to allow turning of the sprocket to force film 12 lengthwise past the source of light. The inner end of rod 18' is positioned against the outer surface of frame 10B and is connected by means of a screw to a washer positioned on the opposite side of the frame. A coiled spring is positioned between the washer and the frame so as to allow rod 18' to freely rotate with a relatively small degree of friction. Sprocket 18 is positioned between carriages 13 and 14.

Wall 52 of spool 34 is positioned within and is concentric with wall 49. Likewise, spool 33 is positioned within and is concentric with carriage 14. Each rod 39 and 40 is positioned respectively centrally with respect to the ring-shaped walls of spools 34 and 35. Two guide means 16 and 23 are mounted to frame 10B by shouldered screws and route the film from one carriage past the source of light to the other carriage. Each guide has a cylinder which is rotatable on the shouldered screw threaded into frame 10B.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. In combination with an apparatus for viewing a reelable strip of film, said apparatus having a frame, a source of light mounted on said frame, guide means mounted on said frame and operable to guide said film in a path past said light source, a viewing screen mounted on said frame and positioned to receive said light after said light passes through said film to display an image of said film, wherein the improvement comprises:

driving means mounted to said frame and engageable with said film being operable to force said film lengthwise in said path past said light source; and, a first and second film carriage mounted on said frame to receive opposite ends of said film, said first and second carriage each having spring means to exert opposite tension forces on said film;
   said first carriage has a first rod and a first film receiving spool rotatably mounted on said rod;
   said second carriage has a second rod and a second film receiving spool rotatably mounted on said second rod;
   said spring means of said first carriage is a first spring strip with an inner end connected to said first rod and an outer end connected to said first spool, said strip is helically wound about said first rod to force said first spool to rotate on said first rod to pull said film into said first carriage; and,
   said spring means of said second carriage is a second spring strip with an inner end connected to said second rod and an outer end connected to said second spool, said second strip is helically wound about said second rod to force said second spool to rotate on said second rod to pull said film into said second carriage;

said first carriage has a first ring-shaped wall fixedly mounted to said frame, said first spool has a second ring-shaped wall positioned within and concentric with said first ring-shaped wall, said first rod is positioned centrally within said second ring-shaped wall, said first spring strip is connected to said first rod and said first spool urging relative rotational movement of said second ring-shaped wall with respect to said first ring-shaped wall in one direction but is yieldable to allow said second ring-shaped wall to rotate in an opposite direction; and, said second carriage has a third ring-shaped wall fixedly mounted to said frame, said second spool has a fourth ring-shaped wall positioned within and concentric with said third ring-shaped wall, said second rod is positioned centrally within said fourth ring-shaped wall, said second spring strip is connected to said second rod and said second spool urging relative rotational movement of said fourth ring-shaped wall with respect to said third ring-shaped wall in one direction but is yieldable to allow said fourth ring-shaped wall to rotate in an opposite direction;

said first ring-shaped wall is slotted to receive said film which wrappingly engages said second ring-shaped wall; and, said third ring-shaped wall is slotted to receive said film which wrappingly engages said fourth ring-shaped wall;

a first disc mounted to said first rod and freely rotatable thereon, said first disc being positioned within said second ring-shaped wall and retaining said first strip therein; and, a second disc mounted to said second rod and freely rotatable thereon, said second disc being positioned within said fourth ring-shaped wall and retaining said second strip therein.

2. The combination of claim 1 and further comprising:

a first cover mounted to said first rod and enclosing said first film carriage; and, a second cover mounted to said second rod and enclosing said second film carriage.

3. In combination with an apparatus for viewing a reelable strip of film, said apparatus having a frame, a source of light mounted on said frame, guide means mounted on said frame and operable to guide said film in a path past said light source, a viewing screen mounted on said frame and positioned to receive said light after said light passes through said film to display an image of said film, wherein the improvement comprises:

an external front wall mounted on said frame adjacent said screen, said guide means being mounted to and projecting outwardly from said front wall;

a first and second film carriage mounted externally on said front wall to receive opposite ends of said film, each carriage having a helical spring mounted therein to exert opposite tension forces on said film; and a rod rotatably mounted to said front wall and projecting outwardly therefrom, said rod having a sprocket mounted thereon in driving engagement with said film and also having a knob end to facilitate manual rotation of said rod to drive said film and wherein said first carriage has a first rod and a first film receiving spool rotatably mounted on said rod;

said second carriage has a second rod and a second film receiving spool rotatably mounted on said second rod; said spring of said first carriage is a first spring strip with an inner end connected to said first rod and an outer end connected to said first spool, said strip is helically wound about said first rod to force said first spool to rotate on said first rod to pull said film into said first carriage; and, said spring of said second carriage is a second spring strip with an inner end connected to said second rod and an outer end connected to said second spool, said second strip is helically wound about said second rod to force said second spool to rotate on said second rod to pull said film into said second carriage.

4. The combination of claim 3 wherein:

said first carriage has a first ring-shaped wall fixedly mounted to said frame, said first spool has a second ring-shaped wall positioned within and concentric with said first ring-shaped wall, said first rod is positioned centrally within said second ring-shaped wall, said first spring strip is connected to said first rod and said first spool urging relative rotational movement of said second ring-shaped wall with respect to said first ring-shaped wall in one direction but is yieldable to allow said second ring-shaped wall to rotate in an opposite direction; and, said second carriage has a third ring-shaped wall fixedly mounted to said frame, said second spool has a fourth ring-shaped wall positioned within and concentric with said third ring-shaped wall, said second rod is positioned centrally within said fourth ring-shaped wall, said second spring strip is connected to said second rod and said second spool urging relative rotational movement of said fourth ring-shaped wall with respect to said third ring-shaped wall in one direction but is yieldable to allow said fourth ring-shaped wall to rotate in an opposite direction.

5. The combination of claim 4 wherein:

said first ring-shaped wall is slotted to receive said film which wrappingly engages said second ring-shaped wall; and, said third ring-shaped wall is slotted to receive said film which wrappingly engages said fourth ring-shaped wall.

6. The combination of claim 5 and further comprising:

a first disc mounted to said first rod and freely rotatable thereon, said first disc being positioned within said second ring-shaped wall and retaining said first strip therein; and, a second disc mounted to said second rod and freely rotatable thereon, said second disc being positioned within said fourth ring-shaped wall and retaining said second strip therein.

* * * * *